March 26, 1968    T. L. THOMPSON ET AL    3,375,361

OPTICAL ILLUMINATION SYSTEM

Filed Nov. 10, 1965    3 Sheets-Sheet 1

THOMAS L. THOMPSON
THEODORE J. SCHULZE
INVENTORS.

BY *Jacque L. Meiter*

AGENT.

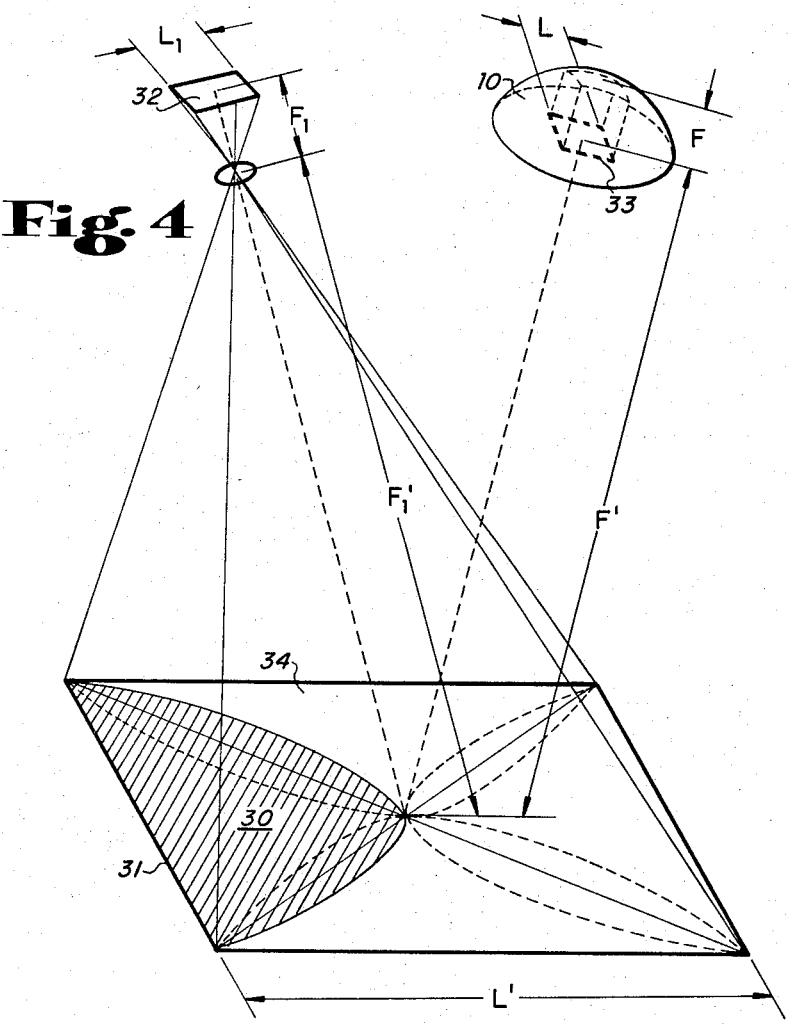

THOMAS L. THOMPSON
THEODORE J. SCHULZE
INVENTORS.

AGENT.

United States Patent Office 3,375,361
Patented Mar. 26, 1968

3,375,361
OPTICAL ILLUMINATION SYSTEM
Thomas L. Thompson, Ingleside, and Theodore J. Schulze, Hinsdale, Ill., assignors to Chicago Aerial Industries, Inc., Barrington, Ill., a corporation of Delaware
Filed Nov. 10, 1965, Ser. No. 507,179
6 Claims. (Cl. 240—1.3)

This invention relates generally to an optical illumination system and, more particularly, to an optical illumination system for aerial electronic flash photography.

Equipment which provides a so-called electronic flash by means of a gaseous discharge lamp is well-known and has been used for many years in non-aerial photographic applications. The primary advantage of electronic flash equipment is the capability of providing high intensity flashes of short duration at high repetition rates. The particular disadvantages of this equipment in the field of aerial photography have been the weight of the high voltage power supply and the lack of sufficient illumination distributed evenly over the area of photographic interest. Thus, efforts to apply electronic flash techniques to aerial photography have been largely unsuccessful to date.

Because of its many advantages in the field of aerial photography, continuing efforts are being made to overcome the disadvantages. Thus far, these efforts have been directed mostly toward improving the flash tubes and developing lighter weight power supplies. However, up to this time very little has been accomplished with regard to the development of more efficient techniques in using the available illumination with the exception of the Illumination Optical System disclosed by Walter L. Colterjohn in U.S. patent application Serial No. 259,110, filed February 18, 1963, now Patent No. 3,251,984. Although Colterjohn does shown significant accomplishment, there is still much to be desired in terms of efficiency and uniformity of illumination distribution.

Therefore, it is a general object of this invention to provide a new and improved optical illumination system for use in aerial flash photography.

It is another object of this invention to provide an improved optical illumination system which makes more efficient use of the emitted illumination than systems now in use.

An important object of this invention is to provide an optical illumination system that distributes the emitted illumination with improved uniformity over the area to be photographed.

Another object of this invention is to provide an improved optical illumination system for flash photography by reducing the obscuration of the principal reflector.

Yet another object of this invention is to prolong the life of the equipment by an improved system of heat dissipation.

These and other objects of the present invention are achieved by employment of a unique phenomenon, the discovery of which forms the basis of this invention. Briefly, this concerns the illumination pattern formed by a single straight tubular light source particularly positioned with respect to a pair of reflectors. Before proceeding further with a description of the invention, it might be well to review some well-known principles of reflector systems.

In general, the inventive optical illumination system is of the type which utilizes both a principal reflector and a forward reflecting element having facing concave surfaces and located on opposite sides of the light source. The purpose of the forward reflector element is to intercept and reflect the forward emitted illumination back into the principal reflector. In this way, more of the illumination from the light source is reflected by the principal reflector thus increasing the efficiency of the system. Without the forward reflector element, most of the illumination not within the solid angle formed by the principal reflector would be lost for all practical purposes since it would disperse greatly before reaching the area of photographic interest.

Naturally, the above mentioned elements of the illumination system must be accompanied by some means of support to hold them in proper relationship to one another. As may be obvious, the size of the forward reflector and the supports must be kept to a minimum in order to avoid obstructing the illumination from the principal reflector thus reducing system efficiency. The basic system, then, consists of four elements; a principal reflector, a light source, a forward reflector, and support means.

Ordinarily, in these illumination systems, the light source is positioned along the optical axis of the principal reflector at (or very near) the focal point. Thus, the illumination pattern is an imperfect image of the light source modified by the bulk of the forward reflector and support structure. This type of pattern is not usually the most suitable for photographic purposes because the format area is not evenly lighted. The ordinary camera has a square or rectangular format area and the illumination pattern produced as here described will have a tendency to be very bright in the center with gradual fall-off toward the edges and very little illuminaton in the corners. To provide light in the corners of the format area would require enlarging the illumination pattern. However, this would cause a great deal of illumination to fall outside of the area of interest thus lowering the efficiency of the system.

From the foregoing discussion it is apparent that the ideal illumination system for photography would provide a substantially uniformly lighted area precisely coincident with the area imaged upon the camera format. Basically, this is exactly the accomplishment of the inventive illumination system.

The inventive system as presented herein stems from the discovery that one straight tubular light source particularly located at a lateral distance from the optical axis of the principal reflector in a system such as previously discussed will form a roughly triangular illumination pattern that has a sharply defined base and good uniformity of distribution. More specifically, the light source is positioned approximately a focal distance from the principal reflector at a point half its own length from the optical axis of that reflector and oriented to be perpendicular to the plane defined by that optical axis and the midpoint of the source. With a spherical or paraboloidal principal reflector, this locates the center of the tubular light source at a point which is in focus to a segment of the reflector. Because, as is well understood in the optical arts, for every axis of a sphere that may be constructed, there exist two focal points so that the locus of all of these focal points is a smaller sphere of radius R/2 concentrically within the original sphere of radius R. An analogous configuration exists for a paraboloid. This positioning of the light source accounts for the sharply defined base of the triangular illumination pattern, since that base is the image of the tubular source. The remainder of the triangular illumination pattern is formed by distorted and defocused images of the light source formed by other portions of the principal reflector.

Although the presently preferred embodiment of the invention locates the plane containing the light source at a point just outside of the focal point on the optical axis of the principal reflector, it must be understood that this point is obtained experimentally. Therefore, the optimum location of that plane for a given application or configuration of light sources may be at some other point along the optical axis at or near the focal point.

Having discovered the novel properties of the off-axis location of a single tubular light source, the inventors, recognizing the need for square format illumination occurring in photography, arranged four such sources end-to-end in the form of a square to achieve that end. Thus, the triangular illumination patterns of the individual lamps were combined to form a square illumination pattern with the apexes of the individual triangles at the center. Optical measurements of the combined pattern show that somewhat greater illumination falls near the edges, thus achieving the additional and distinct advantage of partially compensating for the lens system of an associated camera, the transmission efficiency of which normally falls off in that area. The dimensions of the pattern for any given focal length principal reflector are proportional to the lengths of the tubular light sources; that is, shorter tubes will produce a smaller square and vice versa. However, positioning of the tubes must be readjusted for each different pattern.

Several construction details are of particular importance in the proper operation of the inventive arrangement described above. It is of utmost importance that the forward reflector be designed for minimum obscuration of the principal reflector. In the square arrangement discussed here, the center area is maintained open to allow passage of the reflected rays of luminous energy which form the distinctive edges of the illumination pattern. With a close-centered forward reflector, the illumination pattern would be formed by reflections mainly from the outer portions of the principal reflector thus having lower intensity near the edges than the pattern formed by the open-centered forward reflector configuration. It is also necessary in the reduction of obscuration of the principal reflector that the supports holding the forward reflector be of the smallest cross sectional area consistent with their mechanical function. In order to further reduce obscuration of the principal reflector, the support brackets in the present invention are also advantageously utilized to carry electrical current to the light sources thus obviating the need for a clutter of wires.

Another advantage to having an open-centered square configuration of the forward reflector is the improved heat dissipating properties inherent in such a formation. This is particularly important in an electronic flash system using relatively high repetition rates such as often required in aerial photography.

All of the foregoing advantages of the present invention together with other novel characteristics are set forth with particularity in the appended claims. Perhaps the best understanding of the operation and organization of the invention itself, however, will be obtained by reference to the following description and accompanying drawings in which:

FIGURE 4 is a pictorial representation of the relationships between the inventive system, the camera format and the illumination pattern in the area of photographic interest;

Figure 1:
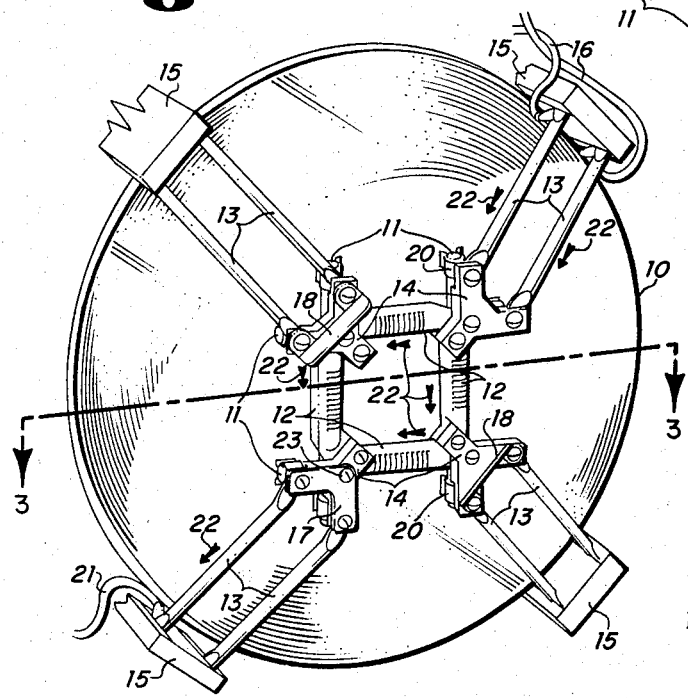
FIGURE 1 is a perspective view of one embodiment of the inventive illumination system.

Referring now to the drawings, and more particularly to FIGURE 1 thereof, there is illustrated an overall perspective view of a preferred embodiment of the subject invention. Four electronic flash tubes 11 in a square configuration each with an associated cylindrical forward reflector element 12 are arrayed in front of a spherical principal reflector 10. The square array is held in place, symmetrical about the optical axis of the principal reflector, by four sets of support arms 13. Each set of support arms is, in turn, supported by an insulating member 15 which is attached to the main support frame 19 (see FIGURE 3) of the principal reflector 10. The arms 13 are attached to the array of forward reflector elements 12 by means of insulator blocks 14. Insulators 14 provide electrical isolation between the forward reflector elements 12 and the support arms 13 which are used to carry electrical energy from an external source (not shown) to the flash tubes 11. The electrical energy is conveyed to the support arms by means of conductors 16 and from the support arms to the flash tubes 11 by clip-type holders 20. Insulators 15 isolate the arms 13 from the frame 19 of the principal reflector 10. The main support frame 19 of the reflector 10 forms no part of the invention and may be of any conventional construction.

The illustrated embodiment of the invention shown in FIGURE 1 indicates the flash tubes 11 to be electrically connected in a series-parallel configuration with current flowing in the directions shown by the arrows 22. Current paths are along the supports 13 and through the tubes 11 with the series connection of the tubes made by shunts 18. Ground connection is made by shunt 17 through conductor 21 and the support arm 13 joining the two. The array of forward reflector elements 12 is also connected to ground by means of screw 23 through insulator 14. As will be obvious to one skilled in the art, any desired electrical connection other than the one illustrated may be made by suitable location of input conductors 16, shunts 17 and 18, and ground conductor 21. The exact electrical circuitry does not form a part of this invention.

Figure 2:
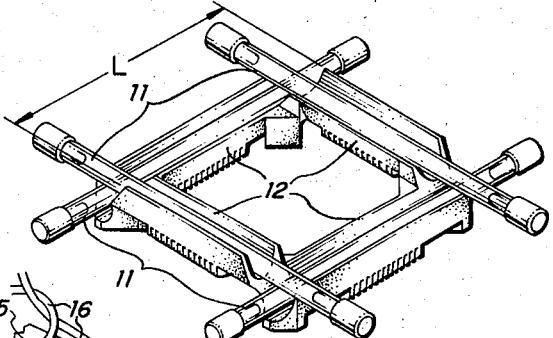
FIGURE 2 is an enlarged perspective view of the forward reflector-flashtube combination configuration.

The basic feature of the present invention is the off-axis location of the flash tubes 11 with respect to the optical axis of the principal reflector 10. This feature applies to one flash tube or a number of flash tubes arranged to form a closed essentially coplanar figure symmetrical about the optical axis. As illustrated in the inventive embodiment herein described, four flash tubes are employed in the form of a square array and this configuration is preferred for ordinary photographic applications. A forward reflector element 12 is associated with each flash tube 11, thus the complete forward reflector is also a square. The configuration of the combination is shown in FIGURE 2, where the relationships between these components can be seen more clearly. It is to be noted in FIGURE 2 that the combination of forward reflector elements 12 forms an open-centered configuration. The importance of this feature cannot be overemphasized, as will be explained in the following description of the inventive arrangement.

Figure 3:
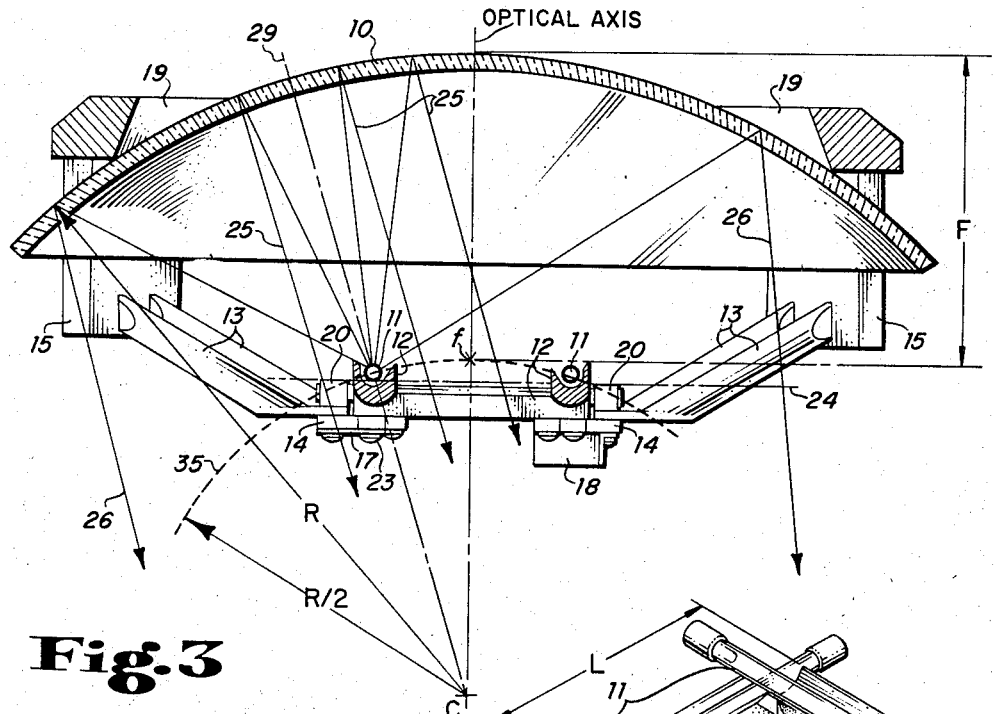
FIGURE 3 is a section taken at 3—3 in FIGURE 1.

The relationship of the forward reflector-flash tube combination array to the principal reflector 10 is depicted in the cross sectional view of FIGURE 3. In this illustration, the principal reflector is shown as a portion of a sphere of radius R and focal length F although a paraboloidal section could be substituted with suitable changes in flash tube positioning. The forward reflector elements 12 are cylindrical and may be of any convenient cross sectional shape such a circular, paraboloidal, elliptical or involute. The differences in efficiencies being small, the choice of shape is governed by factors of cost and ease of manufacture. In the preferred embodiment of the invention shown, the elements 12 are basically right circular cylinders positioned coaxially about each flash tube 11. As shown more clearly in FIGURE 6, the cross section of element 12 is not exactly a half circle. Rather, the sides have been extended to enclose the flash tube and prevent loss of illumination by sidewise radiation. The plane 24 of the flash tubes 11 is shown as perpendicular to the optical axis of the principal reflector 10, passing through the axis slightly outside of the focal point $f$ so that the flash tubes themselves are tangent to a phantom sphere 35 of radius $R/2$. This phantom sphere represents the locus of focal points of the spherical reflector 10.

Thus, each of the flash tubes 11 is focused by the reflector 10 but along some axis other than the optical axis, these axes being different from one another as well as from the optical axis. An example of one of these "alternate axes" is shown in FIGURE 3 as line 29 passing through one of the flash tubes 11 and the center of curvature c of the reflector 10.

Based on the preceding reasoning, the rays from each flash tube 11 reflected by the principal reflector 10 would be directed essentially parallel to the "alternate axis" of that flash tube, since the flash tube is at the focal point on that axis. Several of these reflected rays are shown as 25 and 26 in FIGURE 3. The rays 25 reflected from points on the reflector 10 nearest to its intersection with "alternate axis" 29 will be more sharply focused than rays 26 from portions of reflector 10 farther away from this intersection.

The ground illumination pattern 34 formed by the inventive arrangement is indicated in FIGURE 4, wherein the shaded area 30 approximately represents the contribution from one of the four flash tube-forward reflector combinations. Phantom lines are used to indicate the individual illumination patterns of the other three flash tube-forward reflector combinations when four flash tubes arranged as shown in FIGURE 1 are employed. The slight overlapping of the interior edges of the triangles, as indicated by the phantom lines, contributes to the overall uniformity of the composite pattern. The importance of the open-centered configuration of the inventive arrangement now becomes apparent as it is seen in FIGURE 3 that a great number of the sharply focused rays 25 pass through the opening. Thus, if the forward reflector elements 12 were arranged in a solid configuration, many of the rays 25 would be blocked and the edge 31 and corners of pattern 30 would not be as fully illuminated. There would also be an undesirable drop in total illumination efficiency.

Figure 5:
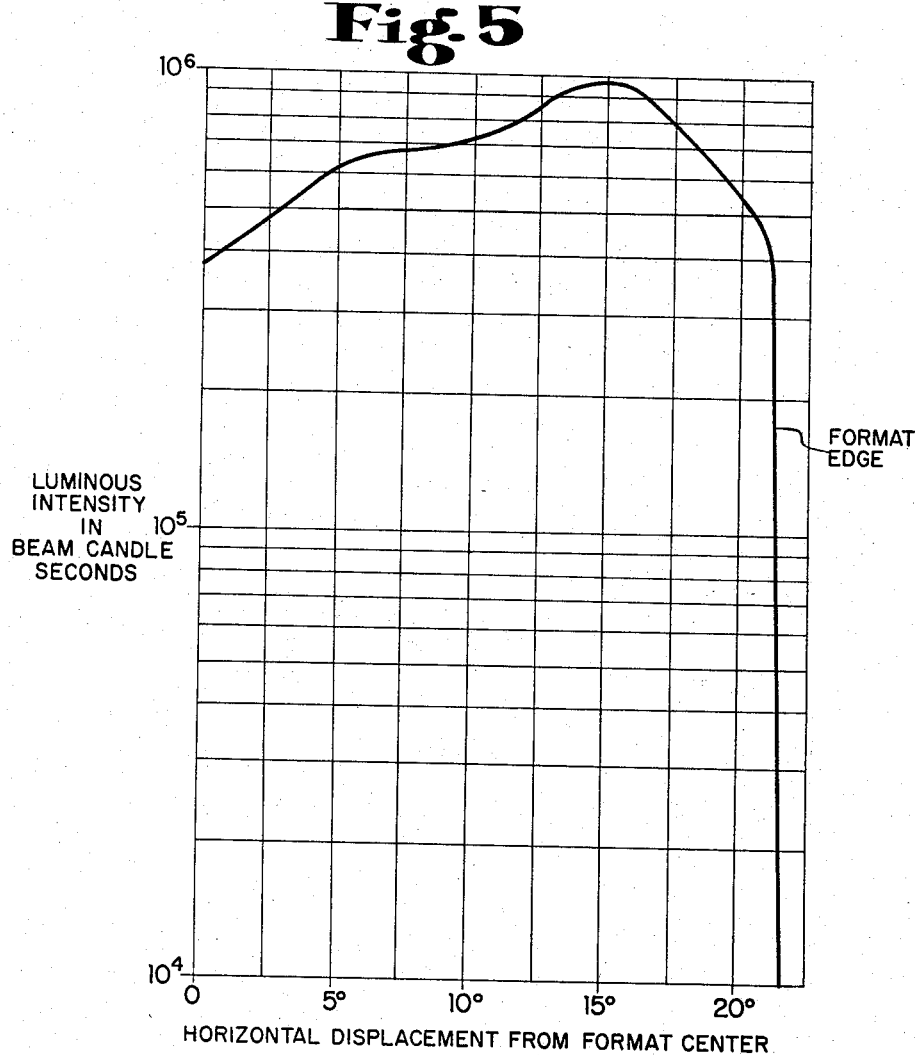
FIGURE 5 is a graph illustrating the distribution uniformity and edge definition of a typical illumination pattern.

An advantageous feature of the inventive configuration is that, in addition to forming a sharply defined illumination pattern with straight sides, it distributes the illumination very evenly throughout the pattern. FIGURE 5 shows a plot of luminous intensity versus angular displacement produced by a typical model of this embodiment of the invention. This curve shows the luminous intensity to increase somewhat as the angular displacement increases, thus indicating that the illumination pattern is actually brighter near the edges than in the center. This characteristic becomes an advantage when taken in combination with a photographic lens system, the transmission efficiency of which usually falls off around the edges of the format area. Therefore, the characteristic edge brightening of the inventive arrangement compensates the low efficiency area of the camera lens and the effective illumination pattern density is even more uniform than shown in FIGURE 5. The graph also indicates the sharp definition of the edge of the illumination pattern by the rapid decline of luminous intensity beyond a value of angular displacement corresponding to the off-axis placement of the flash tube.

Figure 6:
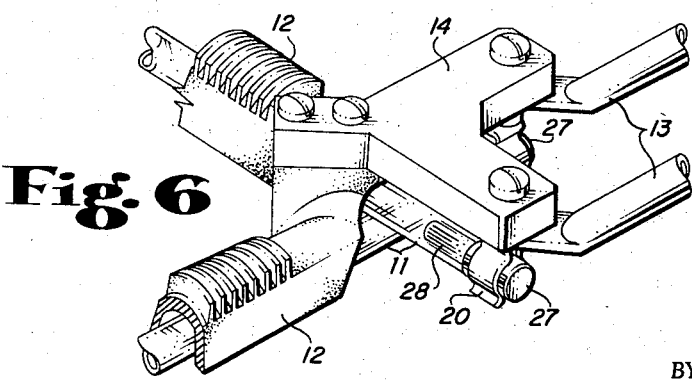
FIGURE 6 is a detail showing the construction devices used to aid heat dissipation in the inventive system.

An important feature of the inventive configuration is its ability to dissipate heat because of certain details of construction as illustrated in FIGURE 6. Electronic flash tubes, by nature, generate a great amount of heat during excitation. In fact, the temperature of the arc during excitation rises above the melting point of aluminum, which is the preferred material for the forward reflector elements 12. Therefore, in order to protect the system, it is necessary to dissipate the excess heat, preferably by transfer to the surrounding air. From there, the heat can be further dispersed by means of blowers or some other method of air circulation. Because of the proximity of the flash tubes 11 and forward reflector elements 12, as shown in FIGURE 6, much of the arc heat is absorbed by the elements 12. The usual method of heat dissipation is to provide the largest possible amount of surface area. This is accomplished in the inventive arrangement by the aforementioned open-centered configuration and the use of cooling fins on the reflector elements 12 as illustrated in FIGURE 6.

Another device used to dissipate heat in the inventive configuration illustrated in FIGURE 6 is the insulator 14. This insulator is made of beryllium oxide which has the unusual combination of relatively high thermal conductivity along with the electrical insulating property of ceramic materials. The insulators 14 have a large surface area in direct contact with the forward reflector elements 12 so that they effectively enlarge the area of the elements 12 for heat dispersion purposes by their own size as well as by that of the pair of support arms 13 to which they are connected. The support arms are advantageously shaped into an elongated rectangular cross section so as to maintain a large surface area for heat dissipation while presenting a minimum of obscuration to the principal reflector 10.

It is a feature of the invention that the insulators 14 also serve as the mechanical supports of the flash tubes 11, as shown in FIGURE 6. Clip-type flash tube holders 20 are attached to the arms of insulators 14 through the swaged ends of support arms 13. Thus, electrical connection is made to the end cap 27 of each flash tube 11 from current carrying arm 13 through clip holder 20 while insulator 14 electrically isolates forward reflector element 12. Because light is produced only by the arc portion of the flash tube 11, only that portion need be covered by the reflector element 12. Therefore, the length of the extending arms of insulator 14 is made such that the end cap 27 and electrode 28 portions of the flash tubes 11 extend beyond the forward reflector elements 12. An advantageous result of this arrangement is that the bulk of the insulators 14 and non-light productive parts of the flash tubes 11 lie in an area where their illumination obstruction effect is minimized by being located in the region of diffuse ray generation such as ray 26. The important center section which produces the illumination for the edges and corners of the pattern thus remains unobstructed.

Another feature of the preferred embodiment of the invention may be appreciated by reference to FIGURE 4 wherein the relationships between the forward reflector area 33, the camera format 32 and the ground illumination pattern 34 are illustrated. As has been stated, the length L' of a side of the illumination pattern 34 is directly proportional to the length of the light source, which corresponds to the length L of one side of the forward reflector. In addition, it is a well-known principle of optics that the camera format 32 dimension $L_1$ is proportional to the dimension L' of the area to be photographed in the same ratio that the focal length $F_1$ is to the distance $F_1'$ from that area. Therefore, the illumination pattern 34 may be made to coincide with the area to be photographed by selection of suitable components for the inventive system in combination with a particular camera. Using the designations of FIGURE 4, the following relationship must be fulfilled:

$$\frac{L}{L_1} = \frac{\sqrt{4F^2 - L^2}}{2F_1}$$

It is to be understood that the foregoing relationship was developed for a square camera format. An approximation of a rectangular pattern can be made by choosing a compromise focal length for the principal reflector and using light sources of unequal length to fit the rectangular forward reflector element necessary for the inventive system. However, the uniformity and sharp definition characteristic of the illumination pattern would suffer in such an arrangement. Instead, an oversized square illumination pattern corresponding to the larger dimension of the rectangle could be formed with a consequent waste of illumination overlapping the shorter dimension. In this case, the efficiency of illumination distribution would be lowered, of course.

The two possibilities for illuminating a rectangular area of interest outlined above may be within the limits of acceptability as long as the sides of the desired rectangle are nearly the same length. When an appreciable difference in length exists, a better solution would be to use two or more of the inventive square systems of appropriate size oriented to make the illumination patterns contiguous. For instance, in a rectangle where the ratio of side lengths is 3:2, an oversized 3 x 3 pattern will allow one-third of the illumination to be wasted. Whereas, with the same rectangle, a pair of 2 x 2 patterns side by side would allow only one-fourth of the illumination to go to waste.

It is to be understood the embodiment of the invention herein described is used only for purposes of illustration. For example, while the foregoing discussion has been concerned with intermittently operating flash tubes, any similarly shaped continuously operating light source can be substituted without altering the inventive concept. Thus, those skilled in the art will, no doubt, conceive further variations in structure and it is to be understood that such changes also form a part of this invention insofar as they fall within the scope and spirit of the accompanying claims.

We claim:
1. An optical illumination system for use with a source of electrical energy and a camera of focal length $F_1$, comprising
   a concave principal reflector of focal length F,
   forward reflector means comprising
      at least one cylindrical reflector element of length L positioned facing the principal reflector at a distance F from it, said reflector element being further located at a distance L/2 from the optical axis of said principal reflector and oriented to be perpendicular to the plane defined by said axis and the midpoint of said element,
   support means for securing said forward reflector means to said principal reflector, and
   a straight tubular light source positioned within each cylindrical reflector element.

2. An optical illumination system in accord with claim 1 wherein said principal reflector is spherical.

3. An optical illumination system in accord with claim 1 wherein said principal reflector is paraboloidal.

4. An optical illumination system for use with a source of electrical energy and a camera having a square format with dimensions $L_1$ on a side and focal length $F_1$, comprising
   a principal reflector of focal length F,
   forward reflector means comprising
      four cylindrical reflector elements each of length L, said length L having a ratio to $L_1$ substantially identical to the ratio of $\sqrt{4F^2-L^2}$ to $2F_1$,
      said reflector elements being positioned facing the principal reflector in an essentially coplanar arrangement shaped to form an open-centered square,
      said square being disposed perpendicular to and symmetrical about the optical axis of said principal reflector at a point along said axis outside of the focal point of said principal reflector,
   support means for securing said forward reflector means to said principal reflector, and
   an electronic flash tube positioned within each cylindrical reflector element.

5. An optical illumination system in accord with claim 4 wherein said support means comprise
   a plurality of current carrying support members connected to said source of electrical energy,
   shunting means connected to said support members thereby connecting said flash tubes to said source of electrical energy, and
   retaining means securing said current carrying support members to said forward reflector means and said principal reflector.

6. An optical illumination system in accord with claim 5 wherein said retaining means comprise
   insulating means for electrically isolating said forward reflector means and said principal reflector from said support means,
   said insulating means providing thermal conduction between said forward reflector means and said support means thereby dissipating excess heat by convection to the surrounding air space.

References Cited
UNITED STATES PATENTS

| | | | |
|---|---|---|---|
| 1,881,525 | 10/1932 | Halpern | 240—41.1 |
| 2,001,378 | 5/1935 | Cornwall | 240—41.1 |
| 3,251,984 | 5/1966 | Colterjohn | 240—1.3 |

NORTON ANSHER, *Primary Examiner.*